(12) United States Patent
Beach et al.

(10) Patent No.: US 10,055,925 B2
(45) Date of Patent: Aug. 21, 2018

(54) SYSTEM FOR VOUCHER OR TOKEN VERIFICATION

(75) Inventors: Kirk Beach, Issaquah, WA (US);
Christopher A. Pesch, Mercer Island, WA (US)

(73) Assignee: Coinstar Asset Holdings, LLC, Bellevue, WA (US)

( * ) Notice: Subject to any disclaimer, the term of this patent is extended or adjusted under 35 U.S.C. 154(b) by 2329 days.

(21) Appl. No.: 11/230,310

(22) Filed: Sep. 19, 2005

(65) Prior Publication Data
US 2006/0069654 A1    Mar. 30, 2006

Related U.S. Application Data

(63) Continuation of application No. 09/662,414, filed on Sep. 14, 2000, now Pat. No. 7,113,929, which is a
(Continued)

(51) Int. Cl.
*G07F 7/02* (2006.01)
*G07F 7/10* (2006.01)
(Continued)

(52) U.S. Cl.
CPC ............. *G07F 7/04* (2013.01); *G06Q 20/367* (2013.01); *G06Q 20/387* (2013.01);
(Continued)

(58) Field of Classification Search
CPC ..... G07F 7/00; G07F 7/02; G07F 7/04; G07F 7/08; G07F 7/10; G07F 7/12; G07F 7/127;
(Continued)

(56) References Cited

U.S. PATENT DOCUMENTS

| 576,141 A | 2/1897 | Muenchinger |
| 3,227,363 A * | 1/1966 | Hecker et al. ............... 235/7 R |

(Continued)

OTHER PUBLICATIONS 1-800 Gift Certificate, http://www.800giftcertificate.com, 12 pages [accessed Feb. 16, 1999].
(Continued)

*Primary Examiner* — Jeffrey A Shapiro
(74) *Attorney, Agent, or Firm* — Perkins Coie LLP

(57) ABSTRACT

The present invention allows verification of a voucher or token prior to redemption. The voucher or token has a code associated therewith so that a value of the voucher or token may be stored in a database. Later when the voucher or token is presented to a cashier for redemption, the code is submitted to the database in order to retrieve the value associated with that voucher or token. In this way, the voucher or token is verified before redemption. In one embodiment, a verification system includes a voucher or token database, a recognition subsystem and two transceivers. The database knows the code and value associated with the voucher or token. A recognition subsystem reads the code from the voucher or token. The transceivers couple together the database and the recognition subsystem in such a way that the a query can be made by the recognition system to determine the value associated with the code or otherwise verify the validity of the voucher or token.

23 Claims, 8 Drawing Sheets

Related U.S. Application Data continuation-in-part of application No. 09/608,729, filed on Jun. 30, 2000, which is a continuation of application No. 09/178,441, filed on Oct. 23, 1998, now Pat. No. 6,116,402.

(60) Provisional application No. 60/154,120, filed on Sep. 15, 1999.

(51) Int. Cl.
| | | |
|---|---|---|
| *G07F 7/04* | (2006.01) | |
| *G06Q 20/36* | (2012.01) | |
| *G06Q 20/38* | (2012.01) | |
| *G06Q 20/40* | (2012.01) | |
| *G06Q 30/00* | (2012.01) | |
| *G06Q 30/02* | (2012.01) | |
| *G07F 7/08* | (2006.01) | |
| *G07F 7/12* | (2006.01) | |

(52) U.S. Cl.
CPC ......... *G06Q 20/401* (2013.01); *G06Q 30/018* (2013.01); *G06Q 30/02* (2013.01); *G07F 7/08* (2013.01); *G07F 7/12* (2013.01); *G07F 7/127* (2013.01)

(58) Field of Classification Search
CPC .. G06Q 20/367; G06Q 20/387; G06Q 20/401; G06Q 20/102; G06Q 20/108; G06Q 20/14; G06Q 20/10; G06Q 40/02; G06Q 30/018; G06Q 30/02; G06Q 30/04; G06Q 30/0237; G06Q 30/0238; G06Q 30/207; G06Q 30/0268; H04T 2001/215; H04N 21/47815; Y10S 902/00; Y10S 902/08; G06K 7/10415; G06K 2017/0038
USPC .................. 705/34–45; 194/210–213
See application file for complete search history.

(56) References Cited

U.S. PATENT DOCUMENTS

| | | | |
|---|---|---|---|
| 3,709,145 A * | 1/1973 | Williamson | ..................... 101/66 |
| 4,436,103 A | 3/1984 | Dick | |
| 4,554,446 A | 11/1985 | Murphy et al. | |
| 4,672,377 A | 6/1987 | Murphy et al. | |
| 4,817,043 A | 3/1989 | Brown | |
| 4,882,675 A | 11/1989 | Nichtberger et al. | |
| 5,227,874 A | 7/1993 | Von Kohorn | |
| 5,305,195 A * | 4/1994 | Murphy | ............................ 705/1 |
| RE34,915 E | 4/1995 | Nichtberger et al. | |
| 5,494,136 A * | 2/1996 | Humble | ........................ 186/61 |
| 5,505,449 A * | 4/1996 | Eberhardt et al. | ............. 463/29 |
| 5,619,024 A * | 4/1997 | Kolls | ............................ 235/381 |
| 5,620,079 A * | 4/1997 | Molbak | ........................ 194/217 |
| 5,734,722 A * | 3/1998 | Halpern | ........................ 714/798 |
| 5,748,908 A * | 5/1998 | Yu | ................................... 705/44 |
| 5,759,103 A * | 6/1998 | Freels et al. | .................... 463/42 |
| 5,855,007 A * | 12/1998 | Jovicic et al. | ................... 705/14 |
| 5,903,880 A * | 5/1999 | Biffar | ............................ 705/39 |
| 5,943,423 A | 8/1999 | Muftic | |
| 6,028,920 A * | 2/2000 | Carson | ........................ 379/114.2 |
| 6,116,402 A | 9/2000 | Beach et al. | |
| 6,138,106 A | 10/2000 | Walker et al. | |
| 6,167,381 A * | 12/2000 | Swaine et al. | .................. 705/17 |
| 6,193,155 B1 * | 2/2001 | Walker et al. | ................. 235/381 |
| 6,269,349 B1 | 7/2001 | Aieta et al. | |
| 6,330,544 B1 * | 12/2001 | Walker et al. | .................. 705/14 |
| 6,349,972 B1 | 2/2002 | Geiger et al. | |
| 6,370,240 B1 * | 4/2002 | Woynoski et al. | ....... 379/144.01 |
| 6,694,300 B1 * | 2/2004 | Walker et al. | .................. 705/14 |
| 7,039,603 B2 * | 5/2006 | Walker et al. | .................. 705/26 |
| 7,113,929 B1 * | 9/2006 | Beach et al. | .................... 705/65 |
| RE40,186 E * | 3/2008 | Walker et al. | .................. 705/14 |
| 2002/0034977 A1* | 3/2002 | Burns et al. | ..................... 463/25 |
| 2002/0095335 A1* | 7/2002 | Barnett et al. | .................. 705/14 |
| 2002/0112162 A1 | 8/2002 | Cocotis et al. | |
| 2002/0194069 A1* | 12/2002 | Thakur et al. | .................. 705/14 |
| 2003/0081824 A1* | 5/2003 | Mennie et al. | ............... 382/135 |
| 2005/0230473 A1* | 10/2005 | Fajkowski | ..................... 235/383 |
| 2006/0154722 A1* | 7/2006 | Walker et al. | .................. 463/25 |
| 2007/0215696 A1* | 9/2007 | Macnish | ....................... 235/380 |
| 2007/0276736 A1* | 11/2007 | Guilfoyle | ........................ 705/17 |

OTHER PUBLICATIONS

Gift Certificate Express, http://www.giftcertificateexpress.com, 10 pages [accessed Feb. 16, 1999].
Home Depot Gift Card [2 pages].
NCR, "NCR 7401 Retail Self-Service Solution," 2 pages.
NCR, "NCR 7800 Consumer Price Verifier," http://www3.ncr.com/product/retail/product/catalog/7800.shtml, pp. 1-2 [accessed Mar. 18, 1999].
Spectrum One, "Spectrum One® Network Solutions for Wireless Data Capture," http://www.symbol.com/ST0000129.HTM, pp. 1-5 [accessed Mar. 18, 1999].
Symbol Technologies, Inc., "PriceChecker System," 2 pages.
Symbol Technologies, Inc., "Spectrum One® SAB-Lite™," 2 pages.
SymbolSolutions, "Supermarket Buys Two Solutions for the Price of One," http://www.symbol.com/solution/017SS.HTM, pp. 1-3 [accessed Mar. 18, 1999].

* cited by examiner

SYSTEM FOR VOUCHER OR TOKEN VERIFICATION

CROSS REFERENCE TO RELATED APPLICATIONS

This application is a continuation of U.S. patent application Ser. No. 09/662,414, filed Sep. 14, 2000, now U.S. Pat. No. 7,113,929 which claims priority from U.S. Provisional Patent Application Ser. No. 60/154,120, filed Sep. 15, 1999, which applications are incorporated herein in their entireties by reference; and application Ser. No. 09/662,414 is a continuation-in-part application of U.S. patent application Ser. No. 09/608,729, filed Jun. 30, 2000, which is a continuation application of U.S. patent application Ser. No. 09/178,441, filed Oct. 23, 1998, now U.S. Pat. No. 6,116,402, and incorporated herein in its entirety by reference.

The present invention relates to a verification method and apparatus and in particular to a voucher or token system for verifying payments made in lieu of cash.

BACKGROUND

There are problems with verification of vouchers or tokens (such as printed tokens) used in or sold at retail stores. The vouchers or tokens can be illicitly copied or otherwise forged. These forgeries can be presented for redemption by criminals in order to cheat the participating businesses. Accordingly, there is a desire to verify the vouchers or tokens prior to redemption. Examples of what the vouchers or tokens may be used for include a cash equivalent, event or travel tickets, public transportation, gift certificates, telephone calling cards, and the like.

Certain coin counter machines count a customer's coins and provide a voucher or token redeemable for cash or merchandise, e.g. from a hosting grocery store. The cash value of the voucher or token is generally equal to the coins input to the coin counter minus a service fee. The voucher or tokens is printed on paper which typically has security features which are designed to deter forgery. These security features may include watermarks, holograms, magnetic strips, colored printing, phase changing ink, microprinting or other techniques.

The cashier is generally trained to recognize counterfeit vouchers or tokens. When a voucher or token is presented to the cashier for redemption, the cashier checks the security features of the voucher or token for the indicators of a forgery. As can be appreciated, training is required so that the cashier can efficiently validate the voucher or token prior to redemption. Additionally, the capabilities of forgers is increasing in lock-step with the addition of new security features such that forged vouchers or tokens are a constant threat to participating businesses.

The need for trained cashiers to recognize forged vouchers or tokens limits the ability for cross-redemption of vouchers or tokens. For example, a voucher or tokens printed by a coin counter at a grocery store presented at a neighboring store in a strip mall may be impractical. Although customers would like greater freedom on where to redeem, cross-redemption at other stores would require the cashiers at all participating businesses be well trained. Unfortunately, outside the career cashiers typically at grocery stores, most cashiers are not well trained and could not be relied upon to correctly validate security features. Additionally, cross-redemption increases the risk of multiple redemptions. In multiple redemption situations, a valid voucher or token is copied and presented a many participating businesses in quick succession such that the potential risks to participating businesses are magnified.

Stores typically have a point-of-sale (POS) system for purchasing merchandise. A bar code on each piece of merchandise is scanned at the register whereupon a back room computer is queried for the current price. Communication between the register and the back room computer is typically hard-wired. Once the query is complete, the current price is added to the customer's bill. There are many variations of price query software because each store chain generally has custom software which performs this price query and other functions. This price query software is generally regarded by the stores as a trade secret such that modification of this software by third parties is not desired by the stores. Additionally, these scanners generally only recognize universal product code (UPC) bar codes which limit the type of bar codes which could be read by the scanners without extensive modification of the software. As can be appreciated by those skilled in the art, UPC bar codes do not allow for a great deal of information to be stored as a bar code. Accordingly, modification of the price query software and use of the scanners for verification may be impractical.

Retail stores which accept credit cards generally require checking whether the credit card is valid before the credit card is accepted. In modern checkout systems, a card reader near the cashier is swiped with the card so that magnetic information may be read from the card. This information is passed to an off-site database to determine if the information corresponds to a valid account by way of a telephone modem. Additionally, the cashier may check the signature line on the card or other security features to determine if the card is valid.

Many cashier stations automatically recognize products and coupons by reading a printed bar code. An optical scanning device reads the bar code to retrieve a code associated with the product. A database stored on the back room computer is queried to determine a price associated with that code. Once the price is known, it can be added to the bill. Similarly, coupons also have a bar code. When scanned, the value of the coupon is retrieved and applied toward the bill.

SUMMARY

The present invention allows verification of a voucher or token prior to redemption. The voucher or token has a code associated therewith so that the value, status and/or information related to the voucher or token may be stored, e.g. in a database. Later when the voucher or token is presented for redemption, the code is submitted to the database in order to retrieve the value or other information associated with that voucher or token. In this way, the voucher or token is verified before redemption. Preferably information indicating that the voucher or token has been redeemed is stored in the database (or the information relating to the voucher or token is removed from or modified in the database) to prevent later redemption of copied or otherwise improper vouchers or tokens.

In one embodiment, a verification system includes a voucher or token database, a recognition subsystem and two transceivers. The database knows (or is in communication with a computer or other system which stores or can retrieve) the code and value or other information associated with the voucher or token. A recognition subsystem reads the code from the voucher or token. The transceivers couple together the database and the recognition subsystem in such a way that a query can be made by the recognition system to determine the value associated with the code or otherwise verify the validity of the voucher or token.

BRIEF DESCRIPTION OF THE DRAWINGS

FIG. 5 is a flow diagram of an embodiment of the present invention installed in a retail store, mall, or the like;

FIG. 9 is a flow diagram of an embodiment of the present invention which allows automatic verification and debit of telephone calling cards and the like.

DETAILED DESCRIPTION

Figure 1:
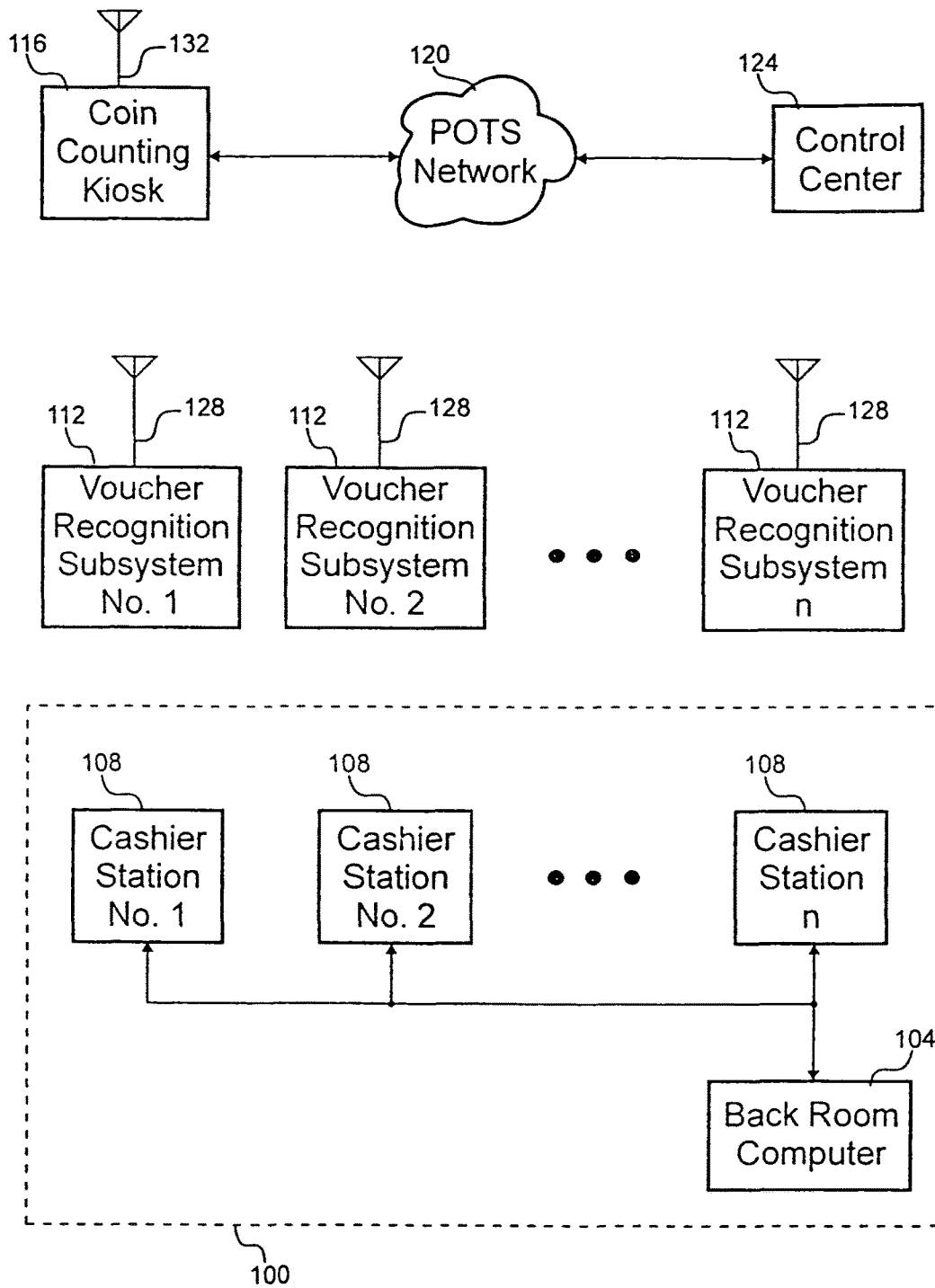
FIG. 1 is a block diagram of an embodiment of a voucher or token verification system and a point of sale (POS) system installed in a retail store.

The voucher or token verification apparatus described herein can be used in connection with a number of devices and for a number of purposes. One device is illustrated in FIG. 1 with the associated point of sale (POS) system 100. Included in the POS system 100 is a back room computer 104 and a number of cashier stations 108. The embodiment depicted in FIG. 1 generally includes a number of voucher or token recognition subsystems 112, a coin counting kiosk 116, a plain old telephone service (POTS) network 120, and a control center 124. For at least the reasons discussed in the Background Information Section, the voucher or token verification apparatus is preferably separate from the POS system 100.

The voucher or token recognition subsystem 112, coin counting kiosk 116 and control center are interconnected. A first antennae 128 on the voucher or token recognition subsystem 112 is coupled to a second antennae 132 on the kiosk 116. Signals pass between the two antenna 128, 132 which allow wireless communication. Wireless techniques are preferred because of the costs associated with hard wiring together the recognition subsystem 112 to the kiosk 116. If desired, further communication occurs between the kiosk 116 and the control center 124 through a direct modem link over the POTS network 120. Use of the POTS network 120 allows great separation between the kiosk 116 and the control center 124.

Figure 2:
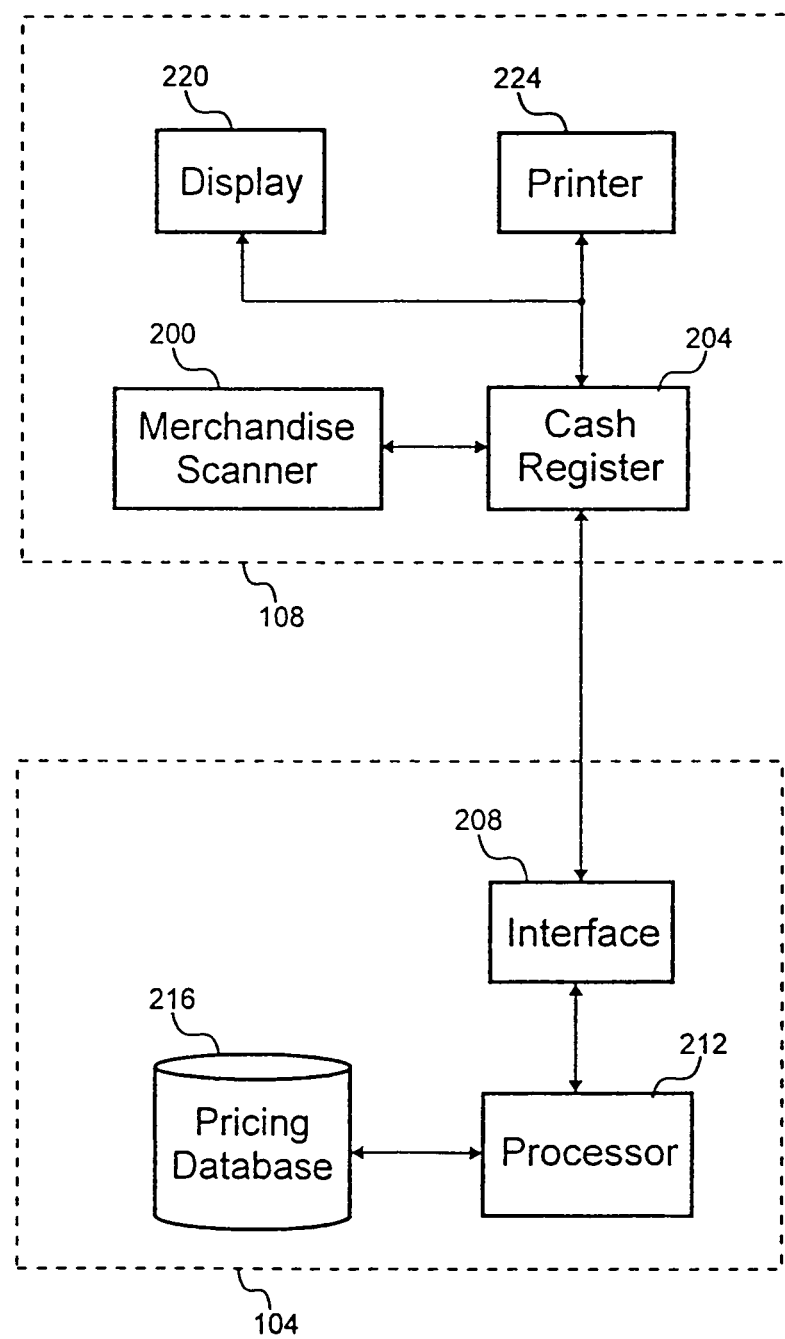
FIG. 2 is a block diagram of the POS system shown in greater detail.

With reference to FIG. 2, a detailed block diagram of the POS system 100 is shown. Depicted are a single cashier station 108 and the back room computer 104. The back room computer 104 provides pricing information so that the customer payment is performed efficiently. Pricing for all the merchandise available in the store is generally maintained by the back room computer 104. To determine pricing, a cashier swipes an item of merchandise in front of a merchandise scanner 200 so that a bar code on the item is read. Next, the bar code is relayed by a cash register 204 in the cashier station 108 to an interface 208 in the back room computer 104. A processor 212 receives the bar code from the interface 208 and formulates a query for a pricing database 216. Once a price is received which correlates to the bar code, the processor 212 forwards the price to the interface 208 whereupon it is relayed to the cash register 204. While adding the price to the total bill, a display 220 and printer 224 present the retrieved price for inspection. In this way, a swipe in front of the scanner 200 automatically retrieves pricing for all items added to the bill.

Figure 3:
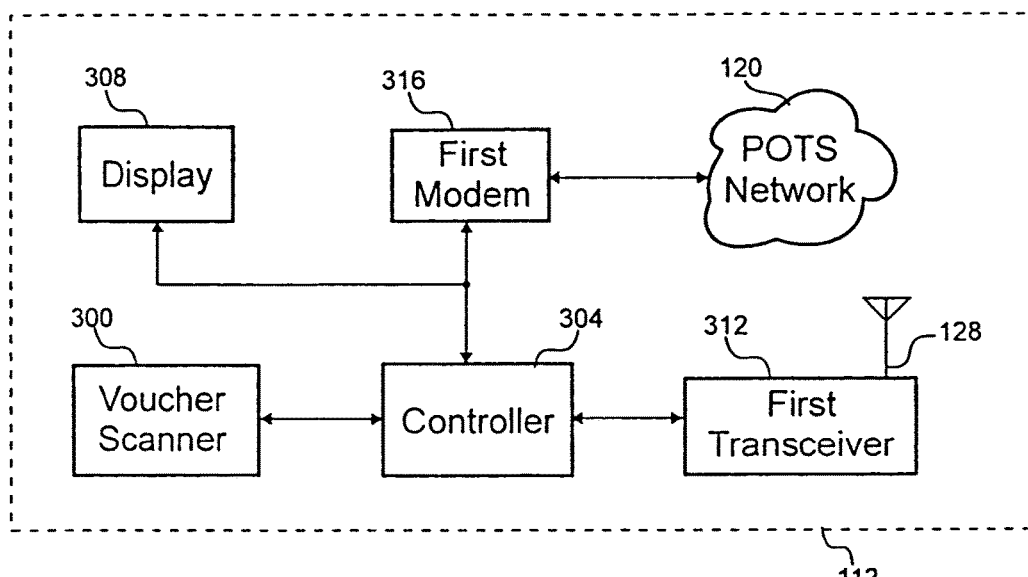
FIG. 3 is a block diagram of a voucher or token recognition subsystem which communicates with a kiosk to verify vouchers or tokens.
Figure 4:
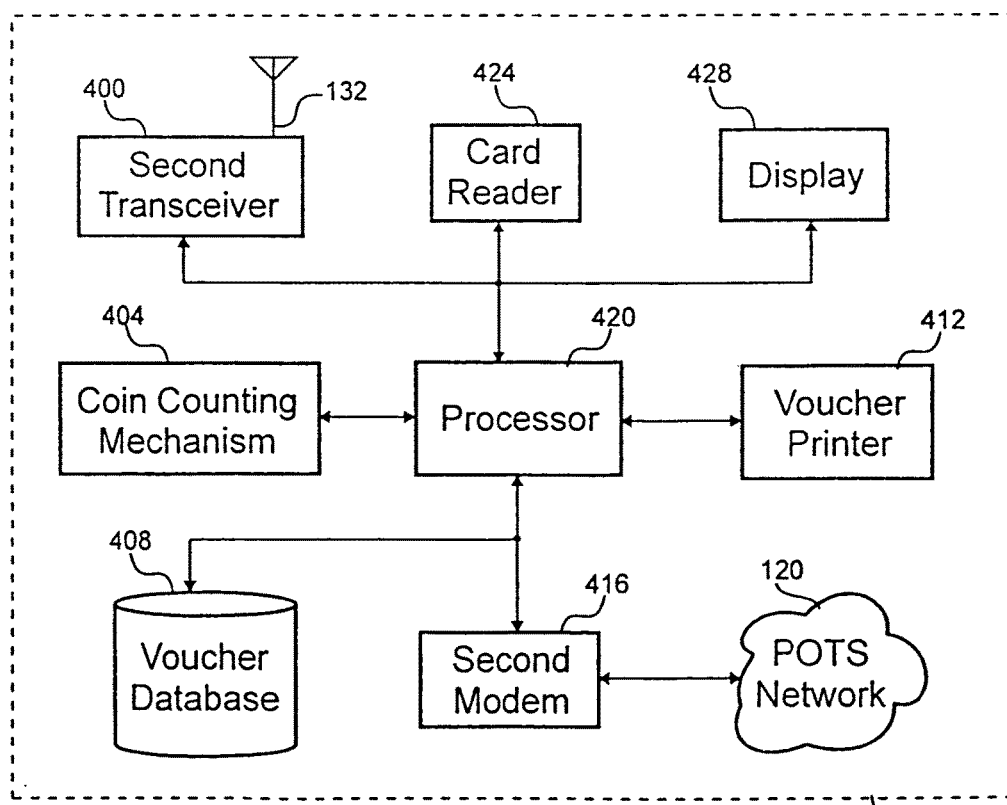
FIG. 4 is a block diagram of a coin counting kiosk which, among other things, counts coins and issues vouchers or tokens.

Respectively depicted in the block diagrams of FIGS. 3 and 4 is a voucher or token recognition subsystem 112 and coin counting kiosk 116. The recognition subsystem 112 of FIG. 3 includes a voucher or token scanner 300, a controller 304, a display 308, a first transceiver 312, a first modem 316, and the first antennae 128. Included in the coin counting kiosk 116 is a second transceiver 400, a coin counting mechanism 404, a voucher or token database 408, a voucher or token printer 412, a second modem 416, a processor 420, a card reader 424, a display 428, and the second antennae 132. A radio communications link between the antennae 128, 132 allow messages to pass between the recognition subsystem 112 and the kiosk 116.

With specific reference to FIG. 3, the constituent parts of the recognition subsystem are explained starting with the scanner 300. When a voucher or token is printed or otherwise output by the kiosk 116, a bar code or other code is printed upon or otherwise associated with the voucher or token. The bar code represents a code. Various security and/or encryption features can be provided in connection with the bar code and/or voucher or token, e.g. as described in U.S. Patent Application Ser. No. 60/105,508 and/or Ser. No. 09/178,441 both filed Oct. 23, 1998, incorporated herein by reference. When presented for redemption, the code on the voucher or token is read by the scanner 300. Each voucher or token includes the code to identify that voucher or token in the voucher or token database 408 of the kiosk 116. The scanner could be a wand scanner, gun scanner, non-portable scanner, magnetic stripe card reader, magnetic ink scanner, optical character recognition (OCR) device or other type of scanner, as is well known in the scanning arts. Preferably, the scanner is capable of reading bar codes such as the Code 30 format which allows larger amounts of information to be stored in the bar code. The bar code could include information such as the time and date issued, the issuing kiosk and/or the modem number of the issuing kiosk or other computing device or system. Embedding a modem facilitates automated cross-redemption as further explained in relation to FIG. 7 below.

The controller 304 manages the operation of the scanner 300, display 308, first transceiver 312, and first modem 316. Scanned bar codes are processed by the controller 304 and transmitted by the first transceiver 312 or first modem 316. Preferably, the transmissions are on secure channels which include encryption and/or other security techniques. Status messages may be presented to the cashier and customer, e.g. by a display 308. The display 308 can be a liquid crystal display (LCD), a light emitting diode (LED) display, voice prompt or other method for conveying information.

The voucher or token code is transmitted to the kiosk 116 for verification by either the first transceiver 312 or first modem 316. The first transceiver 312 is preferably a spread-spectrum radio which wirelessly communicates with the issuing kiosk 116. The first modem 316 is preferably an analog modem which can interface with the POTS network so that a kiosk or other computing system at a distant locale may be contacted for cross-redemption as further discussed in relation to FIG. 7 below.

The coin counting kiosk 116 is shown in FIG. 4. Vouchers or tokens can be produced by the voucher or token printer 412 with a reference to a code which is stored in the voucher or token database 408. Alternatively, the code from an existing card can be recognized by the card reader 424 and stored in the voucher or token database 408. The existing card could be a frequent shopper card, credit card, drivers license, or other card which identifies or is used by the customer. Later, when the voucher or token or existing card is presented for redemption, the database 408 is queried for the status of the voucher or token or existing card. After redemption, any remaining balance after the transaction is recorded in the database 408. Validation requests from recognition subsystems 112 are received from either the second transceiver 400 or second modem 416. These requests may come directly from the recognition subsystem 112 or through the control center 124. Once the processor 420 receives these requests, a query of the voucher or token database 408 is made and the results are relayed back to the second transceiver 400 or second modem 416.

In the preferred embodiment, the kiosk 116 includes the capability to count coins. Coins are input to the kiosk 116 whereupon the coin counting mechanism 404 produces a total cash value of the coins received. Throughout this process, status is provided to the customer on the display 428. The processor 420 takes this amount and reduces it by any service charge. The code is read from an existing card presented to the card reader 424. If no existing card is presented, a voucher or token with a code is produced by the voucher or token printer 412. The code and amount of credit is recorded in the voucher or token database 408 to allow for later verification.

Figure 5:
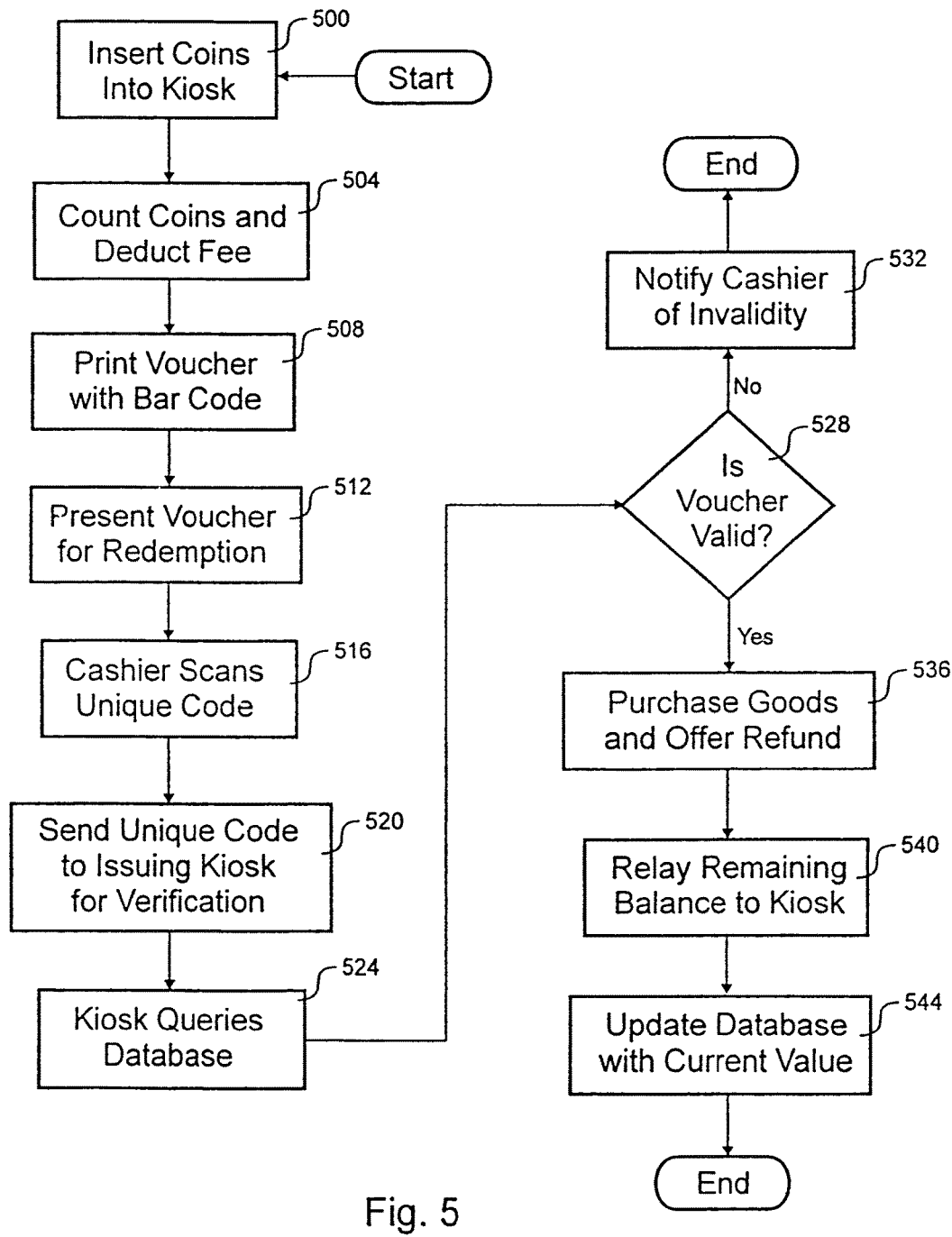

With reference to FIG. 5, a flow diagram of an embodiment of the verification system is shown. This embodiment is suitable for a single store or mall where the recognition subsystem 112 and kiosk 116 are in wireless range (directly or using local repeaters). In step 500, the customer inserts coins into the coin counter kiosk 116. The coins are counted and any service fee is deducted in step 504. Once the amount of credit is known, in step 508, the voucher or token is printed. A code, in the form of a bar code, is recorded on the voucher or token. The credit corresponding to the code is stored in the voucher or token database 408.

After any merchandise is found in a participating business, the customer presents the voucher or token for redemption in step 512. It should be noted, the issuing kiosk 116 may be located inside or outside the store in a location within wireless range. For example, the verification system could be installed in a grocery store where the issuing kiosk 116 is dedicated to that store or in a mall configuration where the issuing kiosk 116 communicates with recognition subsystems 112 in any number of different stores. In step 516, the cashier scans the bar code to read the code. A scanning wand 300 is a compact and convenient device for reading the bar code. The controller 304 in the recognition subsystem 112 relays the code to the issuing kiosk 116 by way of the first wireless transceiver 312 in step 520.

Once the issuing kiosk 116 receives the code, a query can be made. The second transceiver 400 wirelessly receives the code whereupon it is relayed to the processor 420. The query to the voucher or token database 408 is made by the processor 420 in step 524. The query is designed to determine if there is any credit associated with the code. In step 528, the determination is made with regard to the validity of the voucher or token. If there is no credit available, the cashier is notified of the same in step 532. However, if the voucher or token is valid, the credit is applied against any merchandise purchased in step 536. Additionally, any remaining balance can be refunded to the customer. If the customer chooses, any remaining balance can be alternatively stored in the voucher or token database 408 for use at a later time. In a manner similar to that used in the validity query, the database 408 is updated with the revised value of the voucher or token in steps 540 and 544. By validating the voucher or token before redemption in this way, the risk of forgery is reduced or eliminated.

Figure 6:
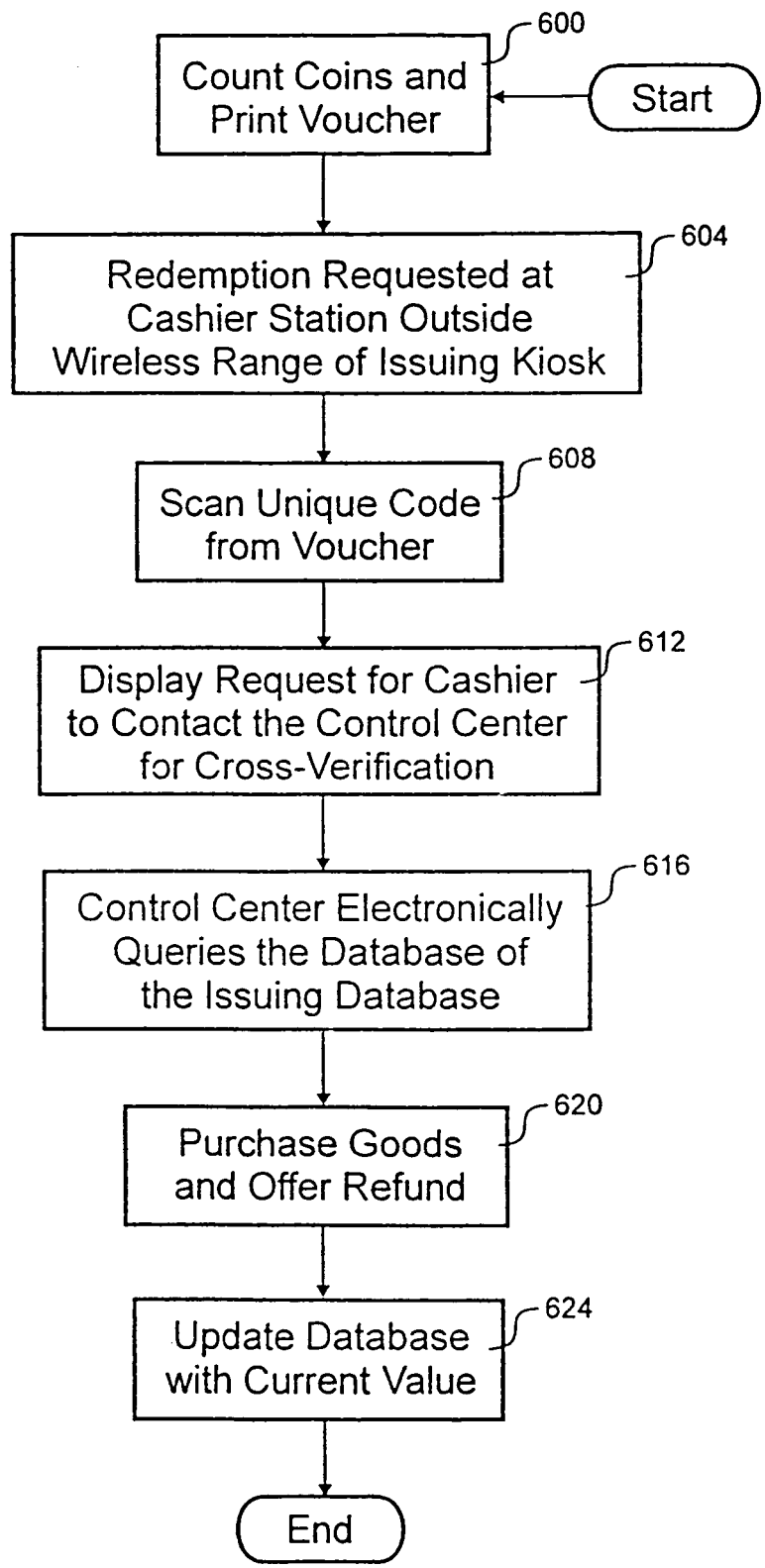
FIG. 6 is a flow diagram of an embodiment of the present invention which allows manual cross-redemption of vouchers or tokens.

FIG. 6 depicts an embodiment of the verification system which allows cross-redemption. Cross-redemption is useful, e.g. where the issuing kiosk 116 is outside the wireless range of the recognition subsystem 112. In step 600, the kiosk 116 counts the coins and prints a voucher or token with a code. The voucher or token database 408 stores the credit associated with the code. Later, the customer shops at any participating business. Participating businesses have a voucher or token recognition subsystem 112, but in this embodiment, that system 112 is not necessarily within wireless range of the issuing kiosk 116. In step 604, the voucher or token is presented at a cashier station 108 for redemption.

The voucher or token is verified prior to redemption to avoid forgeries. In the normal manner, the cashier scans the voucher or token to read the code in step 608. As discussed above, the scanning process may involve a bar code reader or magnetic stripe card reader. A determination is made by the controller 304 as to whether the validity of the voucher or token may be determined from any kiosk 116 within wireless range. This may involve querying any kiosks 116 within range. Once the controller 304 determines the issuing kiosk 116 is outside wireless range, a message is presented on the display 308 instructing the cashier to contact the control center 124 in order to manually cross-verify the voucher or token in step 612. In step 616, an employee at the control center electronically queries the voucher or token database 408 of the issuing kiosk 116. A modem at the control center 124 can dial into the issuing kiosk 116 to make this query. Any cash balance, verified by the control center 124, may be used to purchase the selected merchandise in step 620. After the purchase, the remaining credit could be updated in the voucher or token database 408 of the issuing kiosk 116 for use at a later time in step 624. In this way, vouchers or tokens may be redeemed at any participating business, not just those within wireless range of the issuing kiosk 116.

Figure 7:
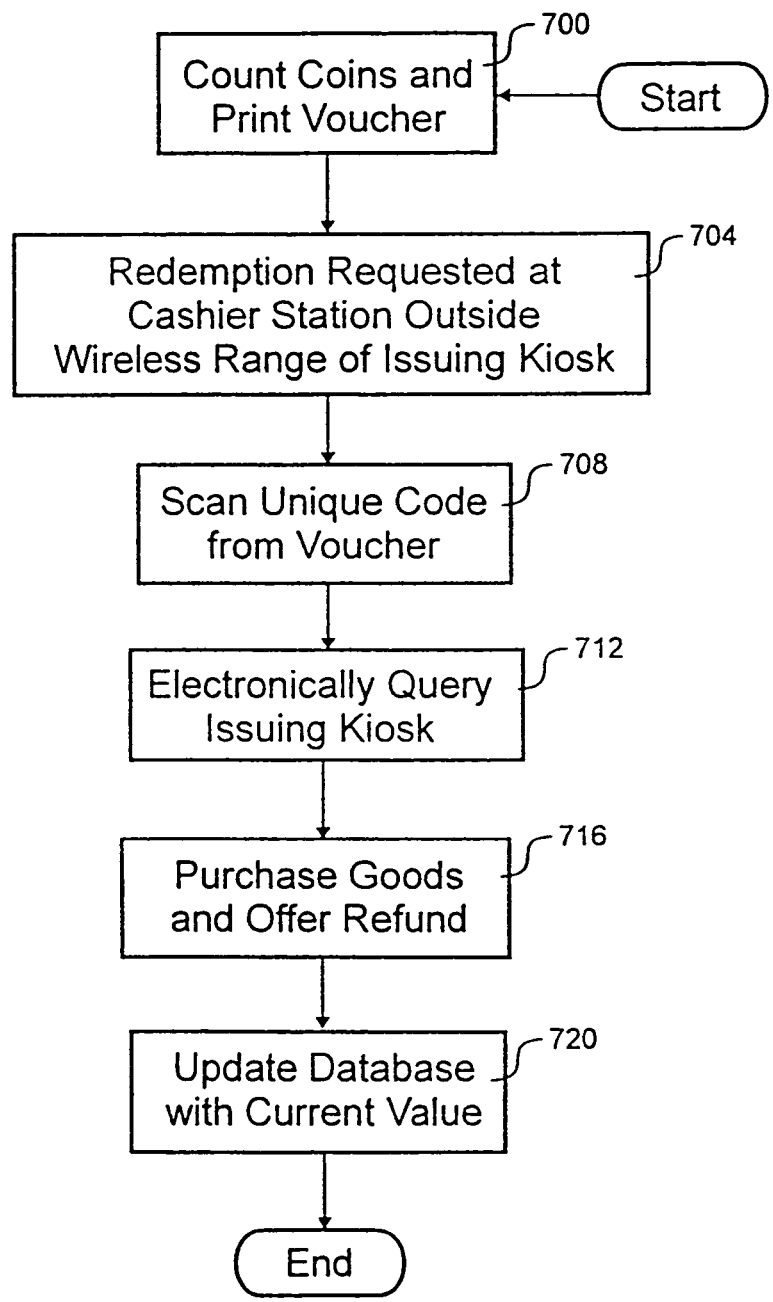
FIG. 7 is a flow diagram of an embodiment of the present invention which provides automatic cross-redemption of vouchers or tokens.

An embodiment which allows automatic cross-redemption is depicted a flow diagram in FIG. 7. In step 700, the coins are counted and a voucher or token for their cash value minus any service fee is printed. In this embodiment, the customer then travels to a participating business outside the wireless range of the issuing kiosk 116. After any shopping, the voucher or token is presented at the cashier station 108 for redemption in step 704. To read the code from the voucher or token in step 708, the voucher or token is scanned. Preferably, the modem number for the issuing kiosk 116 and/or a central system is embedded in the code on the voucher or token. However, a code for that kiosk 116 could be used to query a database of modem numbers. In step 712, the issuing kiosk 116 is electronically queried. The controller 304 in the recognition subsystem 112 can use the first modem 316 to contact the issuing kiosk 116 or a central system by way of the POTS network 120. The credit associated with the code is applied to the desired merchandise in step 716. In step 720, any unused remainder can be relayed to the voucher or token database 408 for later use and/or refund.

Figure 8:
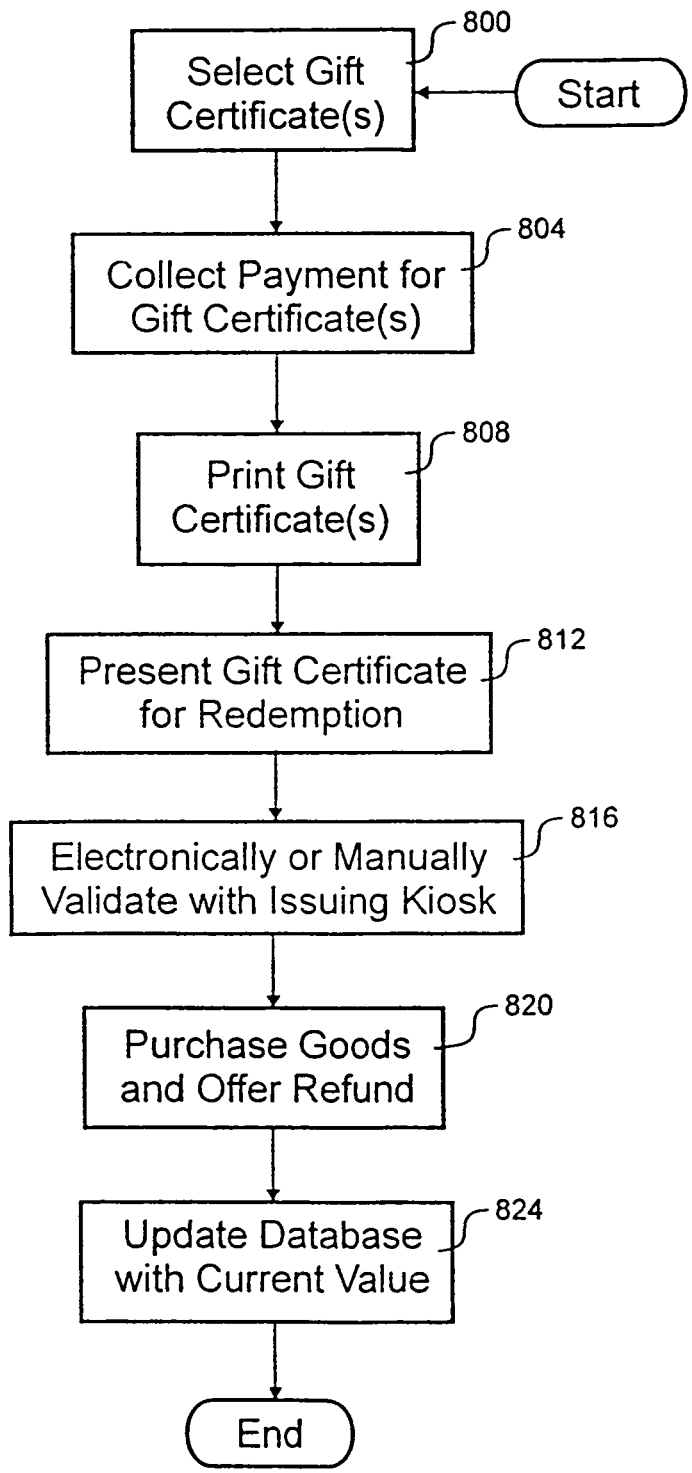
FIG. 8 is a flow diagram of an embodiment of the present invention which allows purchase of gift certificates that can be cross-redeemed.

One embodiment of the voucher or token verification system which can validate gift certificates or similar products is illustrated in the flow diagram of FIG. 8. In step 800, the kiosk 116 may be used by the customer to select one or more gift certificates for purchase. In this embodiment, gift certificates from any number of stores can be made available in one convenient location so that there is no need to travel to each store individually and no need to wait for a clerk or other human to purchase the gift certificate. In step 804, payment for the selected gift certificates is collected from the customer. Payment may be deducted from any credit due from previously counted coins or payment may be charged to a credit card. The card reader 424 in the kiosk 116 can read the credit card or the customer could, alternatively, use a touch screen display 428 to input the credit card information. Once paid for, the gift certificates are printed or dispensed in step 808. Customized graphics and any trade dress can be printed on the gift certificate along with a code, e.g. represented by a bar code. In step 812, a customer presents the gift certificate at the designated store for redemption. Electronically or manually, the gift certificate is validated by contacting the issuing kiosk 116 (or a different kiosk and/or a central database) in step 816. As discussed above, electronic verification uses a modem in the recognition subsystem 112 to directly contact the issuing kiosk 116 or other computer system or may wirelessly contact the issuing kiosk 116 or other computer system. Once verified, the gift certificate is used to purchase any merchandise in step 820. Any remaining balance may be returned to the consumer or recorded in the voucher or token database 408 in step 824.

Figure 9:
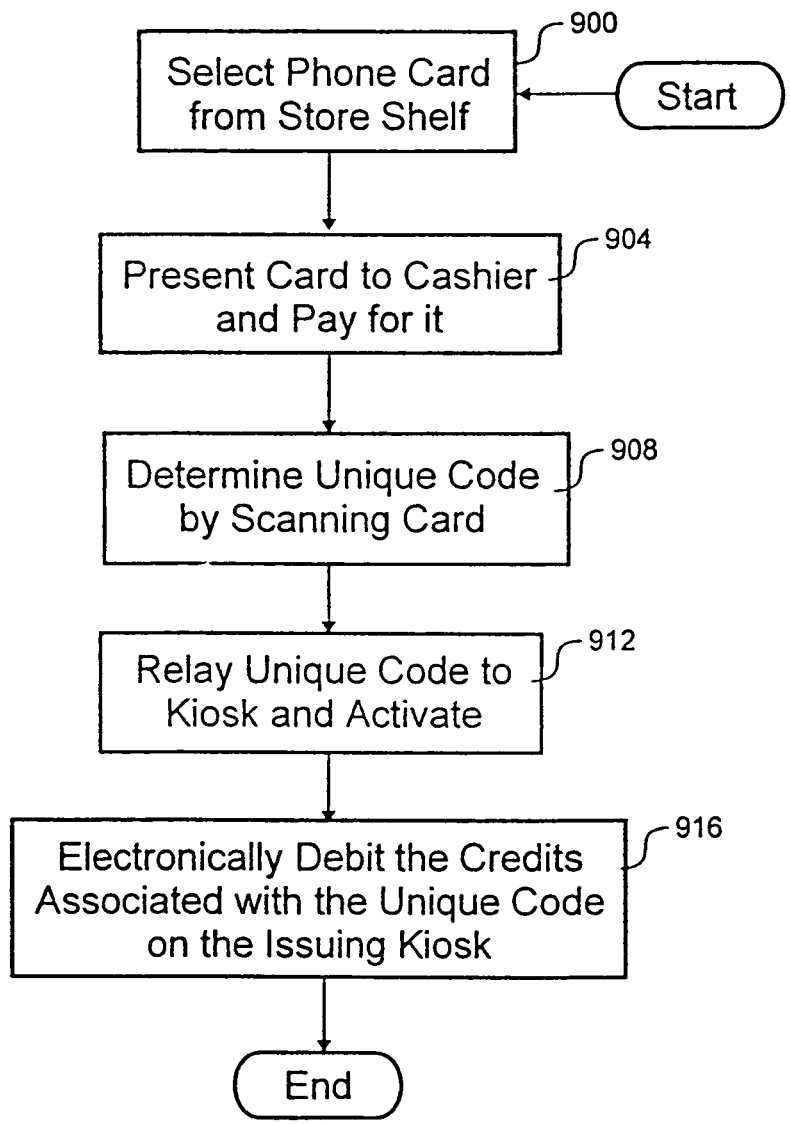

Depicted in the block diagram of FIG. 9 is an embodiment which allows for verification of phone cards and similar instruments. In step 900, a phone card is selected from the store shelves for purchase. While on the shelves, the phone cards are not activated, in the sense that any attempted use will result in notification that the card is not currently valid for use. Accordingly, this item while small enough to easily steal, is worthless to the potential thief. In step 908, the card is presented to the cashier for purchase. The cashier swipes the card through a card reader 300 to scan in the code associated with this card. The code is relayed to the associated kiosk or other computer system electronically, whereupon it is activated in step 912. This step may involve wireless contact through a first transceiver 312 or wired contact through the first modem 316. Once active, the customer is free to use the phone card to make phone calls. The customer may be required to call a special phone number on the card through which the call is placed. Additionally, the customer may be required to enter the code so that the phone use may be correlated to the code. Alternatively, the phone could include a card reader which allows electronic verification of the code. Once the system associates the phone call with the code, the balance on the database corresponding to this card may be debited accordingly.

In another embodiment, a central control center 124 is used to directly verify the voucher or token. The issuing kiosk 116 reports to the control center 124 the issuance of the a voucher or token. The code and/or credit associated with the voucher or token is stored by the control center 124. During redemption, the voucher or token is scanned to retrieve the code and/or credit. Verification of the credit is performed by, e.g. the first modem 316 automatically contacting a database in the control center 124. Alternatively, the cashier could directly contact the control center 124 to verify the voucher or token. In either case, the control center 124 would record any partial or complete redemption of the voucher or token.

The database, which tracks redemption of the vouchers or tokens, could be distributed among many locations so that at least some verification data (e.g. for recently-issued vouchers or tokens) is stored locally (e.g., on the kiosk) rather than always calling the central system, i.e. a "distributed database." After issuance, the kiosk 116 could store at least some of the codes and/or credits for a period of time. For example, vouchers or tokens for small amounts could be stored in the kiosk 116 for enough time for purchases at cashier stations 108 to take place. A few hours would typically provide enough time for the shopper who wished to redeem the voucher or token nearby. After that predetermined time, the codes and/or credits could be relayed and stored in the control center 124. In other embodiments, vouchers or tokens for large amounts could be immediately relayed to the control center 124 which may have more advanced verification, e.g. a human operator.

A number of variations and modifications of the invention can also be used. Although, some the of discussion has been related to store credit vouchers or tokens, the verification methods are equally applicable to event or travel tickets, mass transit passes, financial instruments, etc. Any prepaid instrument which would benefit from verification could be used with this system. Although some embodiments only referred to using a printed voucher or token, a card with a magnetic stripe may also be used with any embodiment. The card with a magnetic stripe may be supplied by the kiosk or be a preexisting card with a code. Embodiments described herein include use of modems to interconnect with a POTS network, however other embodiments could use satellite links, Internet connections, leased digital lines, local area networks, etc. To provide the wireless communication between the recognition subsystem and kiosk, conventional wireless systems in stores which support addressing or multiple drops could be utilized. Further, the wireless communication could be infra-red, cellular phone, or any other wireless technique. Further still, carrier current or data over telephone voice techniques could be used to respectively transmit information on the preexisting power, telephone or other wires. The discussion thus far has been in the context of a coin counting kiosk, however, the ability to count coins is not required. Payment for the vouchers or tokens offered by the kiosk could come from a credit card or other payment source.

The above discussion of the verification system did not interface to the POS system, however, other embodiments could be partially or fully integrated with such a system. The coin counting kiosk could be fully integrated to the POS system so that the merchandise scanner or any card reader of the cashier station could be used to avoid replication. Additionally, even without full integration, the merchandise scanner and card reader in the cashier station could be wired to the recognition subsystem. In this way, the scanner and card reader could interface with the controller, modem and transceiver without needing connection to the POS system. In one embodiment, after a purchase (e.g. 620), any remaining credit may be offered to the customer.

Embodiments discussed thus far have stored the code and credit associated therewith on the issuing kiosk. However, this information could be stored in a central location such as the control center. After each kiosk received a code and credit, some or all of this information could be uploaded to the control center. Verifications would involve contacting the nearest or most convenient kiosk which would in turn (if necessary) query the control center electronically. In this way, contact with the issuing kiosk for every verification would be unnecessary.

Some embodiments of the present invention store the amount associated with the voucher or token. This allows for partial redemption whereby the voucher can be presented many times until the credit is depleted. However, other embodiments could only allow total redemption. Accordingly, the system need only verify whether this voucher or token code has already been redeemed instead of storing/verifying value. The first time the token or voucher is redeemed, future attempts to redeem would not be allowed.

In light of the above description, a number of advantages of the present invention are readily apparent. Vouchers or tokens, gift certificates, phone cards, and the like may be verified so that forgery is reduced or eliminated. The use of wireless transceivers eliminates any need to install wiring to support these features. Cross-redemption of vouchers or tokens becomes possible so a kiosk in a distant locale may be contacted for verification.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

We claim:

1. A system for processing coins, the system comprising:
   a first coin counting machine;
   a second coin counting machine remote from the first coin counting machine, the second coin counting machine having:
      a coin input region configured to receive a plurality of randomly oriented coins from a user;
      a coin discriminator configured to count the coins to determine a total;
      a printer configured to print a machine-readable code and a value on a voucher, wherein the value is related to the total; and
      a dispenser configured to dispense the voucher to the user in exchange for at least a portion of the coins;
   a database configured to receive information from the second coin counting machine related to the voucher; and
   a voucher recognition subsystem remote from the second coin counting machine and the database, wherein the voucher recognition subsystem is configured to read the code off the voucher and send a related query to the first coin counting machine for information related to the voucher, and wherein the first coin counting machine is configured to forward the query to the database for information related to the voucher.

2. The system of claim 1 wherein the database is remote from the first and second coin counting machines.

3. The system of claim 1 wherein the voucher recognition subsystem includes a wireless transceiver for communicating with the first coin counting machine.

4. The system of claim 1 wherein the database receives the voucher code and the voucher value from the second coin counting machine, and wherein the voucher recognition subsystem sends the code to the first coin counting machine as part of the query to verify the voucher value.

5. The system of claim 1 wherein the machine-readable code printed on the voucher includes a bar code, and wherein the voucher recognition subsystem includes a bar code scanner operably coupled to a cashier station in a retail location.

6. The system of claim 1 wherein the first coin counting machine is positioned in a retail location, and wherein the voucher recognition subsystem is positioned at a cashier station in the retail location.

7. The system of claim 1 wherein the first coin counting machine is positioned in a retail location, and wherein the voucher recognition subsystem is positioned remote from the first coin counting machine at a cashier station in the retail location.

8. The system of claim 1 wherein the database is positioned in the second coin counting machine and the first coin counting machine is positioned in a retail location, wherein the voucher recognition subsystem is positioned at a cashier station in the retail location, and wherein the voucher recognition subsystem includes a first wireless transceiver for communicating with a second wireless transceiver operably coupled to the first coin counting machine.

9. The system of claim 1 wherein the machine-readable code printed on the voucher includes encrypted information.

10. The system of claim 1 wherein the machine-readable code printed on the voucher includes encrypted information, and wherein the voucher recognition subsystem is configured to decrypt the encrypted information before sending the query to the database.

11. The system of claim 1 wherein the machine-readable code printed on the voucher includes encrypted information related to the voucher value, and wherein the voucher recognition subsystem is configured to decrypt the encrypted information.

12. The system of claim 1 wherein the value printed on the voucher is equal to the total of coins counted.

13. The system of claim 1 wherein the value printed on the voucher is less than the total of coins counted.

14. A system for processing coins, the system comprising:
   a first coin counting machine positioned in a first retail location, the first coin counting machine having:
      a coin input region configured to receive a plurality of randomly oriented coins from a user;
      a coin discriminator configured to count the coins to determine a total;

a printer configured to print a machine-readable code and a value on a voucher, wherein the value is related to the total; and a dispenser configured to dispense the voucher to the user in exchange for at least a portion of the coins;

a database configured to receive information from the first coin counting machine related to the voucher; and a voucher recognition subsystem configured to read the code off the voucher and send a related query to a second coin counting machine for information related to the voucher, wherein the voucher recognition subsystem is positioned at a cashier station in a second retail location different from the first retail location, wherein the second coin counting machine is positioned in the second retail location, and wherein the second coin counting machine forwards the query to the database for information related to the voucher, wherein the database is positioned in a control center remote from the first and second retail locations.

15. A system for processing coins, the system comprising:

a coin counting machine, the coin counting machine having:

a coin input region configured to receive a first plurality of randomly oriented coins from a first user;

a coin discriminator configured to count the coins to determine a total;

a printer configured to print a machine-readable first code and a value on a first voucher, wherein the value is related to the total; and a dispenser configured to dispense the first voucher to the first user in exchange for at least a portion of the first plurality of coins, wherein the dispenser is further configured to dispense a second voucher to a second user in exchange for at least a portion of a second plurality of coins;

a database positioned in a control center remote from the coin counting machine, wherein the database is configured to receive information from the coin counting machine related to the first voucher;

a voucher recognition subsystem remote from the coin counting machine and the database, wherein the voucher recognition subsystem is configured to read the first code off the first voucher and send a related query to the database for information related to the first voucher, and wherein the voucher recognition subsystem is further configured to read the second code off the second voucher and send a related query to the coin counting machine for information related to the second voucher; and a point of sale system, wherein the point of sale system includes a cashier station operably coupled to a back room computer that is remote from the database, wherein the back room computer provides merchandize pricing information to the cashier station, and wherein the voucher recognition system provides voucher verification information to the cashier station.

16. A system for processing coins, the system comprising:

a coin counting machine, the coin counting machine having:

a coin input region configured to receive a plurality of randomly oriented coins from a user;

a coin discriminator configured to count the coins to determine a total; and a dispenser configured to dispense a financial instrument to the user in exchange for at least a portion of the coins, wherein the financial instrument includes a code;

a database configured to receive information from the coin counting machine related to the financial instrument; and a recognition subsystem configured to read the code off the financial instrument and send a related query to the database for information related to the financial instrument.

17. The system of claim 16 wherein the database receives at least a portion of the code and a value from the coin counting machine, and wherein the value is related to the total.

18. The system of claim 16 wherein the database receives at least a portion of the code and a value from the coin counting machine, and wherein the value is added to an account in the database that is associated with the code.

19. The system of claim 16 wherein the financial instrument is a card having a magnetic stripe that carries the code, and wherein the recognition subsystem includes a card reader configured to read the code off the magnetic stripe.

20. The system of claim 16 wherein the financial instrument is a prepaid credit card having a magnetic stripe that carries the code, and wherein the recognition subsystem includes a card reader configured to read the code off the magnetic stripe.

21. The system of claim 16 wherein the financial instrument is a prepaid phone card having a magnetic stripe that carries the code, and wherein the recognition subsystem includes a card reader configured to read the code off the magnetic stripe.

22. The system of claim 16 wherein the financial instrument is a gift certificate containing the code in machine-readable form, and wherein the recognition subsystem includes a machine for reading the code off the gift certificate.

23. The system of claim 16 wherein the financial instrument is a prepaid credit card having a magnetic stripe that carries the code, wherein the database receives at least a portion of the code and a value from the coin counting machine, and wherein the value is added to an account in the database that is associated with the code, further wherein the recognition subsystem includes a card reader configured to read the code off the magnetic stripe when the user desires to apply at least a portion of the value in the account to a purchase.

* * * * *